Nov. 14, 1933.  R. DELLOYE  1,934,682

PROCESS OF MANUFACTURING REENFORCED GLASS SHEETS

Filed May 6, 1931

INVENTOR
ROBERT DELLOYE
BY Dorsey & Cole
ATTORNEY

Patented Nov. 14, 1933

1,934,682

UNITED STATES PATENT OFFICE 1,934,682

PROCESS OF MANUFACTURING REENFORCED GLASS SHEETS

Robert Delloye, Paris, France

Application May 6, 1931, Serial No. 535,499, and in France May 13, 1930

2 Claims. (Cl. 49—81)

When in the manufacture of safety glasses of the type comprising two plates of glass and an intermediate sheet of plastic material, the cementing of the parts is accomplished in an autoclave heated by a gaseous element such as air, steam, etc., the subsequent cooling requires a long time to even obtain approximate uniformity in the cementing, because of weak spaces left between the glass sheets.

The present invention has for its object the removal of these difficulties. It consists, after the cementing is finished, of injecting water in a fine spray into the autoclave while maintaining the pressure therein, and then, in order to avoid the effects of a sudden drop of pressure, gradually lessening the pressure in the autoclave, and causing the circulation of air to accelerate the evaporation of the water and the lowering of the temperature. The cooling is thus effectuated by means of the finely divided water which absorbs heat of the surrounding space, by the little drops of water which are deposited on the sheets of glass and by the air current circulating in the autoclave at the end of operation.

Experience has shown that the period of cooling can be reduced fifty per cent without danger of breakage.

In the accompanying drawing, I have shown an apparatus suitable for carrying out my invention.

Figure 1:
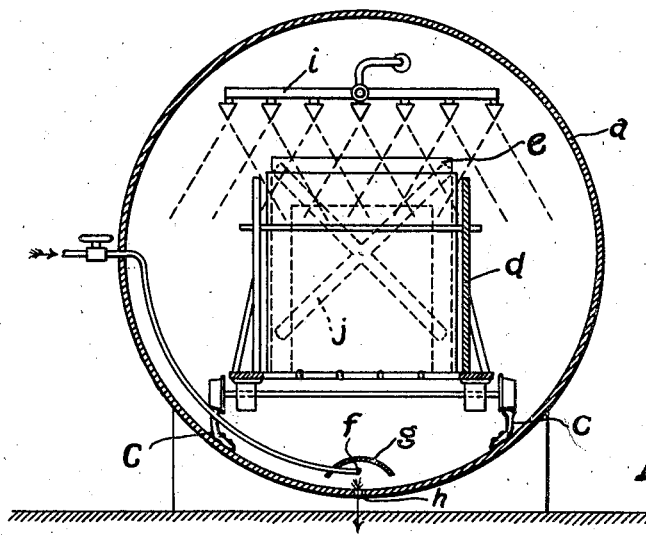
Fig. 1 is a transversal section of the apparatus on line A—B.
Figure 2:
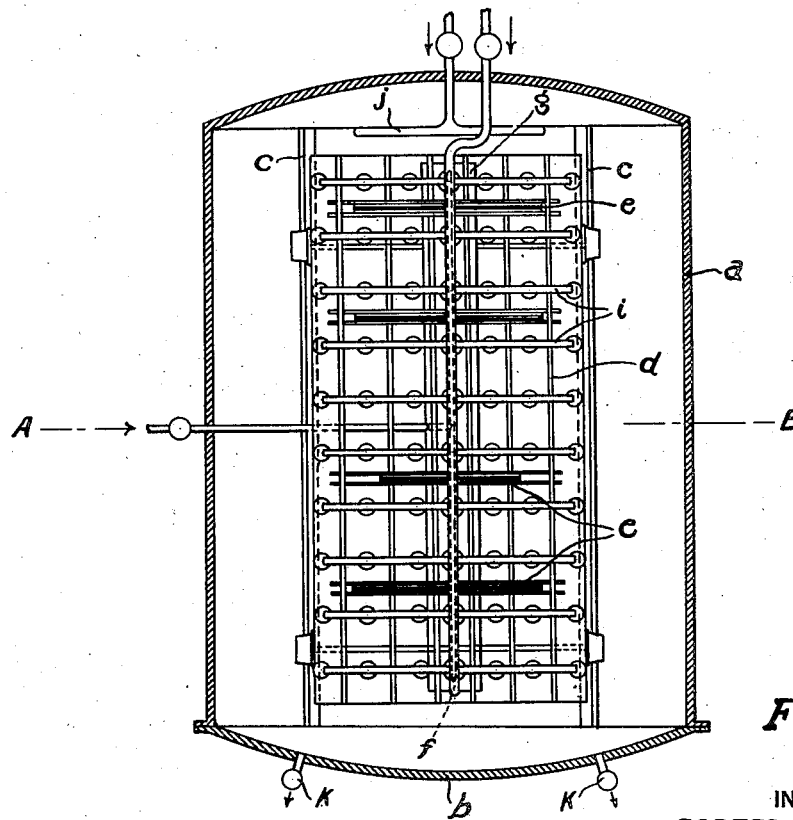
Fig. 2 is a top plan view of the apparatus the upper part of the cylinder being supposed removed.

In this apparatus $a$ represents a suitable autoclave provided with a door $b$ and rails $c$ whereon carriages $d$ are moving supporting sheets $e$ to be cemented. At the lower part of the autoclave a conduct $f$, lying under a deflector, $g$, provided along with small apertures supplies the steam necessary for the heating operation and a water trap $h$ permits the escape of the water. Along the upper part of the autoclave an assemblage of tubes $i$ is arranged used as an atomizer to inject cooling water.

At the end of the autoclave opposite to the door is fixed a conduct $j$ for compressed air.

In the door $b$ can be fixed valves $k$, in order to insure ventilation in the autoclave.

In case the heating is by steam, my process of the invention is carried out in the following manner:

When the heating temperature has been reached uniformly in all parts of the autoclave, steam is replaced by water injected through an atomizer into the autoclave and by compressed air. The water vaporizes and absorbs the heat and, in proportion to the lowering of the temperature, very fine streams of water trickle along the glass sheets. Next the pressure is lowered and then the air escapes from the autoclave and as one continues to admit air under pressure, there is created a current of air in the interior of the autoclave. A drain permits the escape of the water that collects in the lower part of the autoclave.

It is well understood that the details of operation and working of any part of the process, may be varied without departing from this invention. Thus the spraying of the water may be accomplished by many well known forms of nozzles.

What I claim as my invention is:

1. The hereinbefore described method of cooling reenforced glass sheets while in an autoclave heated by a gaseous fluid under pressure acting directly on them, which comprises injecting into the autoclave a water spray, while maintaining for a time the pressure in the autoclave by the introduction of air thereinto for that purpose, then gradually diminishing the pressure in the autoclave while continuing the introduction of air into the autoclave.

2. The hereinbefore described method of cooling reenforced glass sheets while in an autoclave heated by gaseous fluid under pressure acting directly on them, which comprises injecting into the autoclave a water-spray while supplying air to the autoclave in order to maintain the pressure, permitting the drops resulting from the vaporization and condensation of the water-spray to contact with the surfaces of the sheets, gradually diminishing the pressure in the autoclave by permitting the escape of air therefrom, and introducing further air and circulating it in contact with the sheets.

ROBERT DELLOYE.